United States Patent
Min et al.

(10) Patent No.: US 11,307,462 B2
(45) Date of Patent: *Apr. 19, 2022

(54) LIQUID CRYSTAL ALIGNING AGENT COMPOSITION, METHOD FOR PREPARING LIQUID CRYSTAL ALIGNMENT FILM USING SAME, AND LIQUID CRYSTAL ALIGNMENT FILM AND LIQUID CRYSTAL DISPLAY USING SAME

(71) Applicant: LG CHEM, LTD., Seoul (KR)

(72) Inventors: Sungjoon Min, Daejeon (KR); Jung Ho Jo, Daejeon (KR); Soonho Kwon, Daejeon (KR); Hangah Park, Daejeon (KR); Hyeongseuk Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 25 days.

This patent is subject to a terminal disclaimer.

(21) Appl. No.: 16/624,818

(22) PCT Filed: Mar. 29, 2019

(86) PCT No.: PCT/KR2019/003731
§ 371 (c)(1),
(2) Date: Dec. 19, 2019

(87) PCT Pub. No.: WO2019/190276
PCT Pub. Date: Oct. 3, 2019

(65) Prior Publication Data
US 2020/0124922 A1    Apr. 23, 2020

(30) Foreign Application Priority Data

Mar. 30, 2018 (KR) .................... 10-2018-0037709

(51) Int. Cl.
G02F 1/1337 (2006.01)
C08L 79/08 (2006.01)
C09K 19/56 (2006.01)

(52) U.S. Cl.
CPC ........ *G02F 1/133723* (2013.01); *C08L 79/08* (2013.01); *C09K 19/56* (2013.01)

(58) Field of Classification Search
CPC .. G02F 1/133723; G02F 1/1337; C08L 79/08; C08L 79/04; C09K 19/56; C09K 19/52; C08K 5/3412; B29D 22/00; B29D 23/00; B32B 1/08; B32B 27/08; B32B 27/34

See application file for complete search history.

(56) References Cited

U.S. PATENT DOCUMENTS

| | | | |
|---|---|---|---|
| 11,137,644 B2* | 10/2021 | Kim | G02F 1/1337 |
| 2002/0133005 A1 | 9/2002 | Iino et al. | |
| 2005/0188480 A1 | 9/2005 | Lim et al. | |
| 2007/0104895 A1 | 5/2007 | Hotaka et al. | |
| 2008/0103074 A1 | 5/2008 | Stokes et al. | |
| 2008/0113889 A1 | 5/2008 | Ruhe et al. | |
| 2010/0213423 A1* | 8/2010 | Shiau | C09K 19/56 |
| | | | 252/589 |
| 2011/0007254 A1* | 1/2011 | Terashita | C08G 73/1042 |
| | | | 349/123 |
| 2012/0083557 A1 | 4/2012 | Schoening | |
| 2012/0295904 A1 | 11/2012 | Zhi et al. | |
| 2014/0243324 A1 | 8/2014 | Bissonnette et al. | |
| 2015/0002797 A1 | 1/2015 | Roh et al. | |
| 2015/0045481 A1 | 2/2015 | Kim et al. | |
| 2015/0232665 A1* | 8/2015 | Hsu | C08G 73/1042 |
| | | | 524/114 |
| 2015/0252043 A1 | 9/2015 | Zhi et al. | |
| 2016/0122301 A1* | 5/2016 | Furusato | C09K 19/3066 |
| | | | 252/299.61 |
| 2016/0264866 A1 | 9/2016 | Hirschmann et al. | |
| 2016/0320669 A1 | 11/2016 | Lim | |
| 2017/0038642 A1 | 2/2017 | Bae et al. | |
| 2017/0052412 A1 | 2/2017 | Bae et al. | |
| 2017/0362506 A1 | 12/2017 | Hirschmann et al. | |
| 2018/0348578 A1 | 12/2018 | Jo et al. | |
| 2019/0016955 A1 | 1/2019 | Junge et al. | |

FOREIGN PATENT DOCUMENTS

| | | |
|---|---|---|
| CN | 101168697 | 4/2008 |
| CN | 101493610 A | 7/2009 |
| EP | 3067406 A1 | 9/2016 |
| JP | S63-92957 | 4/1988 |
| JP | 2003-215592 | 7/2003 |
| JP | 2008176848 | 7/2008 |
| JP | 2012-150251 | 8/2012 |
| JP | 2012-194537 | 10/2012 |
| JP | 2012194538 | 10/2012 |
| JP | 2015-215591 | 12/2015 |
| JP | 2015215591 A * | 12/2015 |
| KR | 10-20110088394 | 8/2011 |
| KR | 10-20120084253 | 7/2012 |
| KR | 10-2013-0054125 | 5/2013 |
| KR | 10-20130103023 | 9/2013 |
| KR | 10-20140027550 | 3/2014 |

(Continued)

*Primary Examiner* — Anthony J Frost

(74) *Attorney, Agent, or Firm* — Dentons US LLP

(57) ABSTRACT

Provided is a liquid crystal aligning agent composition comprising a hindered amine-based light stabilizer and a polyamic acid polymer derived from a diamine, a method for preparing a liquid crystal alignment film using the same, and a liquid crystal alignment film and a liquid crystal display using the same.

14 Claims, No Drawings

(56) References Cited

FOREIGN PATENT DOCUMENTS

| | | |
|---|---|---|
| KR | 10-20150002121 | 1/2015 |
| KR | 10-20160023717 | 3/2016 |
| KR | 10-20160110900 | 9/2016 |
| KR | 10-20170143365 | 12/2017 |
| TW | 201031980 A | 9/2010 |
| TW | 201231505 A | 8/2012 |
| WO | 0102359 | 1/2001 |
| WO | 2006001444 | 1/2006 |
| WO | 2011046954 | 4/2011 |
| WO | 2012068406 | 5/2012 |
| WO | 2016143884 A1 | 9/2016 |
| WO | 2016146245 A1 | 9/2016 |
| WO | 2017118464 A1 | 7/2017 |

* cited by examiner

LIQUID CRYSTAL ALIGNING AGENT COMPOSITION, METHOD FOR PREPARING LIQUID CRYSTAL ALIGNMENT FILM USING SAME, AND LIQUID CRYSTAL ALIGNMENT FILM AND LIQUID CRYSTAL DISPLAY USING SAME

CROSS-REFERENCE TO RELATED APPLICATIONS

This application is a National Stage Application of international Application No. PCT/KR2019/003731 filed on Mar. 29, 2019, which claims priority to and the benefit of the filing date of Korean Patent Application No. 10-2018-0037709 filed with the Korean Intellectual Property Office on Mar. 30, 2018, the entire contents of which are incorporated herein by reference.

TECHNICAL FIELD

The present invention relates to a liquid crystal aligning agent composition having excellent electrical characteristic and after-image characteristic sufficient for use as high performance liquid crystal displays, and capable of realizing excellent reliability in an outdoor environment such as light or heat, a method for preparing a liquid crystal alignment film using the same, and a liquid crystal alignment film and a liquid crystal display using the same.

BACKGROUND

In a liquid crystal display, a liquid crystal alignment film plays a role of aligning liquid crystals in a predetermined direction. Specifically, a liquid crystal alignment film acts as a director for the arrangement of liquid crystal molecules, and thus, when the liquid crystals move due to an electric field to form an image, it allows the liquid crystals to align in an appropriate direction. In order to obtain uniform brightness and a high contrast ratio in a liquid crystal display, it is essential to uniformly align liquid crystals.

As one of the conventional methods of aligning liquid crystals, a rubbing method of coating a polymer film such as polyimide onto a substrate such as glass or the like and rubbing a surface thereof using fibers such as nylon or polyester in a predetermined direction has been used. However, the rubbing method may cause serious problems during manufacturing process of the liquid crystal panel because fine dust or electrostatic discharge (ESD) occurs when the fiber and polymer film are rubbed.

In order to solve the problems of the rubbing method, a photo-alignment method for inducing anisotropy in a polymer film by light irradiation rather than the rubbing, and aligning liquid crystals using anisotropy has been studied recently.

As materials that can be used for the photo-alignment method, various materials have been introduced, among which polyimide is mainly used for various superior performance of a liquid crystal alignment film. However, polyimide is usually poor in solubility in a solvent, and so it is difficult to apply directly to a manufacturing process of coating it in a solution state to form an alignment film.

Accordingly, after coating in the form of a precursor such as a polyamic acid or a polyamic acid ester having excellent solubility, a heat treatment process is performed at a temperature of 200° C. to 230° C. to form polyimide, which is then subjected to light irradiation to perform alignment treatment.

However, recently, as the required performance of a liquid crystal display has been improved and a low-power display has been required, development of an alignment film satisfying a high level of electrical characteristics for realizing high-quality driving characteristics in a liquid crystal display has been considered important.

Thus, there is a need to develop a liquid crystal aligning agent composition capable of realizing excellent electrical characteristics and reliability sufficient for use as high performance liquid crystal displays, while achieving alignment stability as a liquid crystal alignment film.

DETAILED DESCRIPTION OF THE INVENTION

Technical Problem

It is an object of the present invention to provide a liquid crystal aligning agent composition having excellent electrical characteristics and after-image characteristics sufficient for use as high performance liquid crystal displays, and capable of realizing excellent reliability in an outdoor environment such as light or heat.

It is another object of the present invention to provide a method for preparing a liquid crystal alignment film using the aforementioned liquid crystal aligning agent composition.

It is a further object of the present invention to provide a liquid crystal alignment film prepared by the aforementioned preparation method, and a liquid crystal display including the same.

Technical Solution

In order to achieve the above objects, the present disclosure provides a liquid crystal aligning agent composition including: a polymer containing a polyamic acid repeating unit of the following Chemical Formula 1; and a light stabilizer compound containing a functional group of the following Chemical Formula 3:

[Chemical Formula 1]

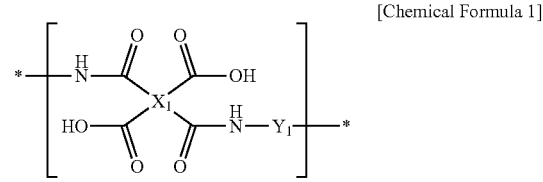

wherein in Chemical Formula 1, $X_1$ is a tetravalent organic group, and $Y_1$ is a divalent organic group of the following Chemical Formula 2:

[Chemical Formula 2]

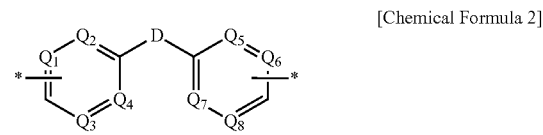

wherein in Chemical Formula 2, at least one of $Q_1$ to $Q_8$ is nitrogen and the rest are carbon, D is —NR'— or —O—, and R' is hydrogen or an alkyl group having 1 to 6 carbon atoms,

[Chemical Formula 3]

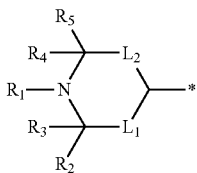

wherein in Chemical Formula 3, $R_1$ is hydrogen or an alkyl group having 1 to 10 carbon atoms; $R_2$ to $R_5$ are the same as or different from each other, and are each independently an alkyl group having 1 to 10 carbon atoms; and $L_1$ and $L_2$ are the same as each other or different from each other, and are each independently a direct bond or an alkylene group having 1 to 10 carbon atoms.

The present disclosure also provides a method for preparing a liquid crystal alignment film including the steps of: coating the liquid crystal aligning agent composition onto a substrate to form a coating film; drying the coating film; irradiating the dried coating film with light or rubbing the coating film to perform alignment treatment; and heat-treating and curing the alignment-treated coating film.

In addition, the present disclosure provides a liquid crystal alignment film which is produced according to the process for preparing the liquid crystal alignment film, and a liquid crystal display including the same.

Hereinafter, a liquid crystal aligning agent composition, a method for preparing a liquid crystal alignment film using the same, and a liquid crystal alignment film using the same according to specific embodiments of the present invention will be described in more detail.

I. Liquid Crystal Aligning Agent Composition

According to one embodiment of the invention, there can be provided a liquid crystal aligning agent composition including: a polymer containing a polyamic acid repeating unit of Chemical Formula 1; and a light stabilizer compound containing a functional group of Chemical Formula 3.

The present inventors have found through experiments that in the case where the light stabilizer compound, which is added together with the polymer containing the polyamic acid repeating unit of Chemical Formula 1, contains a hindered amine-based functional group such as one of Chemical Formula 3 as in the liquid crystal aligning agent composition of the one embodiment described above, when applied to a liquid crystal cell provided with a liquid crystal alignment film obtained from the liquid crystal aligning agent composition, generation of an after-image is remarkably reduced even during long term driving, and the change in voltage holding ratio is small even during heat treatment or light treatment, which can realize excellent reliability thereby embodying certain aspects of the present invention.

Specifically, the polyamic acid repeating unit of Chemical Formula 1 includes a diamine-derived functional group of Chemical Formula 2 corresponding to an asymmetric pyridine structure, and thus can have a high voltage holding ratio at a high temperature, and ameliorate a decrease in the contrast ratio or an after-image phenomenon.

In addition, the light stabilizer compound containing a functional group of Chemical Formula 3 has a hindered amine-based structure which is previously known to exhibit excellent light stability effect, and is added to a liquid crystal aligning agent composition which is a precursor used for manufacturing a liquid crystal alignment film and is stably dispersed. Thus, the reliability of the alignment film can be improved while the light stabilizer compound is sufficiently retained in the liquid crystal alignment film prepared through coating, drying, alignment and curing of the liquid crystal aligning agent composition.

Hereinafter, embodiments of the present disclosure will be described in more detail.

Unless specified otherwise herein, the following terms can be defined as follows.

Throughout the specification, when one part "includes" one constituent element, unless otherwise specifically described, this does not mean that another constituent element is excluded, but means that another constituent element can be further included.

In the present specification, examples of the substituents are described below, but are not limited thereto.

As used herein, the term "substituted" means that other functional groups instead of a hydrogen atom in the compound are bonded, and a position to be substituted is not limited as long as the position is a position at which the hydrogen atom is substituted, that is, a position at which the substituent can be substituted, and when two or more are substituted, the two or more substituents can be the same as or different from each other.

As used herein, the term "substituted or unsubstituted" means being unsubstituted or substituted with one or more substituents selected from the group consisting of deuterium; a halogen group; a cyano group; a nitro group; a hydroxyl group; a carbonyl group; an ester group; an imide group; an amide group; a primary amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an alkoxysilylalkyl group; an arylphosphine group; or a heterocyclic group containing at least one of N, O, and S atoms, or being unsubstituted or substituted with a substituent to which two or more substituents are linked among the substituents exemplified above. For example, "the substituent to which two or more substituents are linked" may be a biphenyl group. That is, the biphenyl group can also be an aryl group, and can be interpreted as a substituent to which two phenyl groups are linked.

As used herein, the notation $\xi$, or ⸺ means a bond linked to another substituent group.

In the present specification, the alkyl group is a monovalent functional group derived from an alkane, and can be a straight-chain or a branched-chain. The number of carbon atoms of the straight chain alkyl group is not particularly limited, but is preferably 1 to 20. Also, the number of carbon atoms of the branched chain alkyl group is 3 to 20. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, 2,6-dimethylheptane-4-yl and the like, but are not limited thereto.

In the present specification, the haloalkyl group means a functional group in which the alkyl group as defined above is substituted by at least one halogen, and the description of the alkyl group as defined above can be applied.

In the present specification, the aryl group is a monovalent functional group derived from an arene, and is not particularly limited, but preferably has 6 to 20 carbon atoms, and can be a monocyclic aryl group or a polycyclic aryl group. The monocyclic aryl group can include, but is not limited to, a phenyl group, a biphenyl group, a terphenyl group, or the like. The polycyclic aryl group can include, but is not limited to, a naphthyl group, an anthracenyl group, a phenanthryl group, a pyrenyl group, a perylenyl group, a chrycenyl group, a fluorenyl group or the like.

In the present specification, the alkenyl group is a divalent functional group derived from alkene, and may be a straight-chain or a branched-chain, and the number of carbon atoms thereof is not particularly limited, but is preferably 2 to 20. According to one embodiment, the alkenyl group has 2 to 10 carbon atoms. According to another embodiment, the alkenyl group has 2 to 6 carbon atoms. Specific examples thereof include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group, and the like, but are not limited thereto.

In the present specification, the alkoxy group may be linear, branched, or cyclic. The number of carbon atoms of the alkoxy group is not particularly limited, but is preferably 1 to 30. Specific examples thereof include methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy, and the like, but are not limited thereto.

In the present specification, the haloalkoxy group means a functional group in which at least one halogen in the alkoxy group as defined above is substituted, and the description of the alkoxy group as defined above can be applied.

In the present specification, the alkylene group is a divalent functional group derived from an alkane, and the description of the alkyl group as defined above can be applied except that the alkylene is a divalent functional group. For example, the alkylene group is a straight chain or a branched chain, and can include a methylene group, an ethylene group, a propylene group, an isobutylene group, a sec-butylene group, a tert-butylene group, a pentylene group, a hexylene group, or the like.

In the present specification, the arylene group is a divalent functional group derived from an arene, and the description of the aryl group as defined above may be applied, except that the arylene is a divalent functional group. For example, the arylene can be a phenylene group, a biphenylene group, a terphenylene group, or the like.

In the present specification, the alkylenebisarylene group is a divalent functional group in which two arylene groups are bonded to both terminal ends of the alkylene group, and the description of the alkylene group and arylene group as defined above can be applied. For example, the alkylenebisarvlene group can be a methyl enebisphenylene group.

In the present specification, a multivalent organic group is a residue in which a plurality of hydrogen atoms bonded to an arbitrary compound are removed, and for example, it can be a divalent organic group, a trivalent organic group, or a tetravalent organic group. As an example, a tetravalent organic group derived from cyclobutane means a residue in which any four hydrogen atoms bonded to cyclobutane are removed.

As used herein, a direct bond or a single bond means being connected to a bond line where no atoms or atomic groups exist at the corresponding position. Specifically, it means the case where no other atoms exist in the parts represented as $L_1$ and $L_2$ in the chemical formula.

(1) Polymer

The polymer can include a polyamic acid repeating unit of Chemical Formula 1. Specifically, in Chemical Formula 1, $X_1$ can be a tetravalent organic group. $X_1$ can be a functional group derived from a tetracarboxylic acid dianhydride compound used at the time of synthesis of a polyamic acid.

More specifically, in Chemical Formula 1, $X_1$ can be one of the tetravalent organic groups of the following Chemical Formula 5:

[Chemical Formula 5]

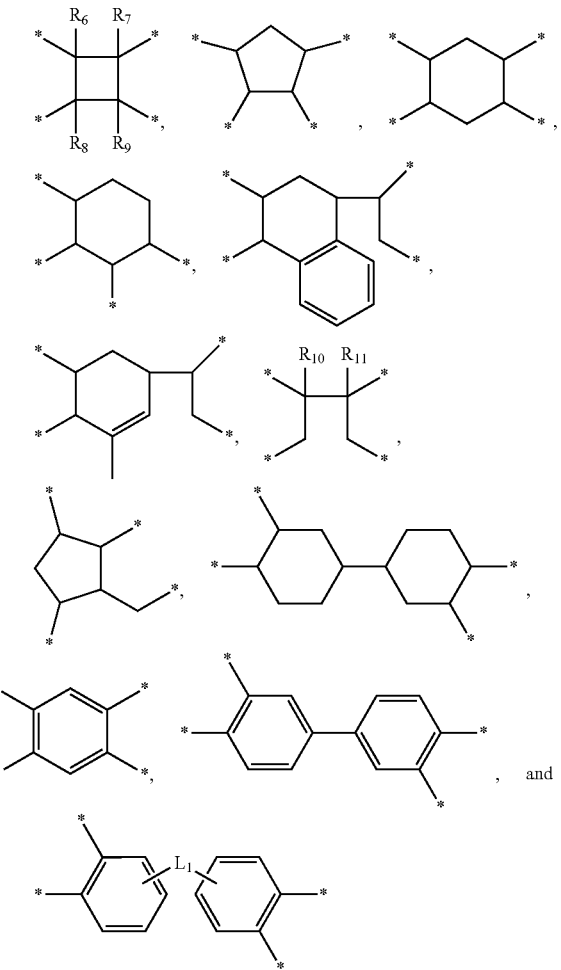

wherein in Chemical Formula 5, $R_6$ to $R_{11}$ are each independently hydrogen, or an alkyl group having 1 to 10 carbon atones; $L_3$ is any one selected from the group consisting of a direct bond, —O—, —CO—, —COO—, —S—, —SO—, —SO$_2$—, —CR$_{12}$R$_{13}$—, —(CH$_2$)$_t$—, —O(CH$_2$)$_t$O—, —COO(CH$_2$)$_t$OCO—, —CONH—, phenylene or a combination thereof, wherein $R_{12}$ and $R_{13}$ are each independently hydrogen, an alkyl group or a haloalkyl group having 1 to 10 carbon atoms; and t is an integer of 1 to 10.

More preferably, $X_1$ can be an organic group of the following Chemical Formula 5-1 derived from pyromellitic dianhydride (PMDA); an organic group of the following Chemical Formula 5-2 derived from 3,3',4,4'-biphenyl tetracarboxylic acid dianhydride (BPDA); an organic group of the following Chemical Formula 5-3 derived from 1,2,4,5-cyclohexanetetracarboxylic dianhydride (HPMDA); or an organic group of the following Chemical Formula 5-4 derived from 1,3-dimethyl-cyclobutane-1,2,3,4-tetracarboxylic acid dianhydride (DMCBDA):

[Chemical Formula 5-1]

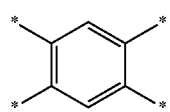

[Chemical Formula 5-2]

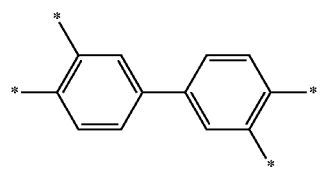

[Chemical Formula 5-3]

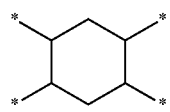

[Chemical Formula 5-4]

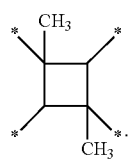

In Chemical Formula 1, $Y_1$ can be a functional group derived from a diamine compound used at the time of synthesis of the polyamic acid. In Chemical Formula 2, at least one of $Q_1$ to $Q_8$ is nitrogen and the rest are carbon, D is —NR'— or —O—, and R' is hydrogen or an alkyl group having 1 to 6 carbon atoms. More specifically, at least one of $Q_1$ to $Q_4$ can be nitrogen and the rest can be carbon, $Q_5$ to $Q_8$ can be carbon, and D can be —NR'—.

Thus, due to the nitrogen atom, the group of Chemical Formula 2 can form an asymmetric structure that is not symmetrical with reference to the central point or center line. The group of Chemical Formula 2 is a repeating unit derived from a diamine, which is a precursor used to form a polymer for a liquid crystal aligning agent, and appears to result from the use of an asymmetric diamine as described below.

In view of the fact that the structure of asymmetric diamines or repeating units derived therefrom, and the effect resulting therefrom have never been acknowledged in the field of polymers for liquid crystal aligning agents known in the art, the repeating unit of Chemical Formula 2 and a diamine compound which is a precursor thereof appear to be novel.

More preferably, the divalent organic group of Chemical Formula 2 can be a divalent organic group of the following Chemical Formula 4 in which $Q_2$ in $Q_1$ to $Q_4$ is nitrogen and the rest are carbon, $Q_5$ to $Q_8$ are carbon and D is —NH—:

[Chemical Formula 4]

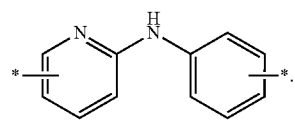

More specifically, a group of Chemical Formula 4 which satisfies the above can be a functional group of one of the following Chemical Formulas 4-1 to 4-3:

[Chemical Formula 4-1]

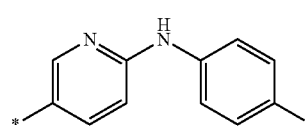

[Chemical Formula 4-2]

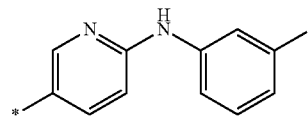

[Chemical Formula 4-3]

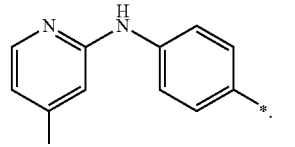

That is, the aromatic ring containing $Q_1$ to $Q_4$ in Chemical Formula 2 can have a pyridine structure. Thus, the liquid crystal display to which the polymer for a liquid crystal aligning agent is applied can realize a high voltage holding ratio and liquid crystal alignment property.

On the other hand, when two aromatic ring compounds are bonded by a single bond without a secondary amine group or a tertiary amine group, there can be technical problems that the brightness fluctuation rate of the liquid crystal aligning agent is increased, the after-image characteristic is poor, and the voltage holding ratio is remarkably reduced.

In addition, when each of the two aromatic ring compounds bonded via a secondary amine group or a tertiary amine group does not contain a nitrogen atom, the imidization reaction cannot proceed sufficiently (for example, through heat treatment at 230° C.) even if the imidization reaction proceeds on the polyamic acid or the polyamic acid ester formed by the reaction of the amine and the acid anhydride. Thus, there is a limit in that the imidization rate in the final liquid crystal alignment film decreases.

Further, the functional group of Chemical Formula 2 is characterized in that only the amine group and hydrogen are bonded to each of the two aromatic ring compounds, preferably the heteroaromatic ring compound and the aromatic ring compound, and no other substituent is introduced. When a substituent, for example, a fluoroalkyl group, is introduced into a heteroaromatic ring compound or an aromatic ring compound, there can be technical problems that the brightness fluctuation rate is increased, the after-image characteristic is poor and the voltage holding ratio is remarkably reduced.

The polymer can further include a polyamic acid ester repeating unit of the following Chemical Formula 6; or a polyimide repeating unit of the following Chemical Formula 7:

[Chemical Formula 6]

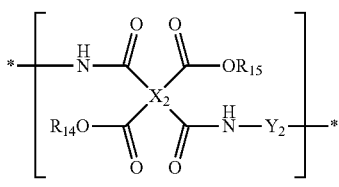

[Chemical Formula 7]

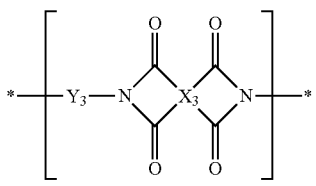

wherein in Chemical Formulas 6 and 7, one of $R_{14}$ and $R_{15}$ is an alkyl having 1 to 10 carbon atoms and the other is hydrogen or an alkyl having 1 to 10 carbon atoms, $X_2$ to $X_3$ are each independently the same as $X_1$ in Chemical Formula 1; and $Y_2$ to $Y_3$ are each independently the same as $Y_1$ in Chemical Formula 1.

That is, the polymer may include a homopolymer containing only the polyamic acid repeating unit of Chemical Formula 1, or a copolymer in which one polyamic acid ester repeating unit of Chemical Formula 6, one polyimide repeating unit of Chemical Formula 7, or two or more repeating units thereof are mixed as needed, while essentially containing the polyamic acid repeating unit of Chemical Formula 1.

The polyamic acid repeating unit, the polyamic acid ester repeating unit, or the polyimide repeating unit may form the main chain of the polymer.

The polymer can further include a polyamic acid repeating unit of the following Chemical Formula 11:

[Chemical Formula 11]

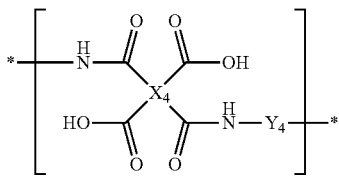

wherein in Chemical Formula 11, $X_4$ is a tetravalent organic group, and $Y_4$ is a divalent organic group of the following Chemical Formula 12:

[Chemical Formula 12]

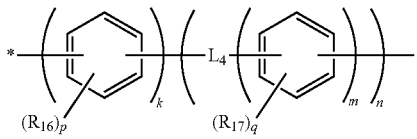

wherein in Chemical Formula 12, $R_{16}$ and $R_{17}$ are each independently any one of hydrogen, halogen, cyano, nitrile, an alkyl having 1 to 10 carbon atoms, an alkenyl having 2 to 10 carbon atoms, an alkoxy having 1 to 10 carbon atoms, a haloalkyl having 1 to 10 carbon atoms, or a haloalkoxy having 1 to 10 carbon atoms; p and q are each independently an integer from 0 to 4, $L_4$ is a single bond, —O—, —CO—, —S—, —$SO_2$—, —$C(CH_3)_2$—, —$C(CF_3)_2$—, —CONH—, —COO—, —$(CH_2)_y$—, —$O(CH_2)_yO$—, —$O(CH_2)_y$—, —NH—, —$NH(CH_2)_y$—NH—, —$NH(CH_2)_yO$—, $OCH_2$—$C(CH_3)_2$—$CH_2O$—, —COO—$(CH_2)_y$—OCO—, or —OCO—$(CH_2)_y$—COO—; y is an integer from 1 to 10; k and m are each independently an integer from 0 to 3; and n is an integer from 0 to 3.

In the polyamic acid repeating unit of Chemical Formula 11, $X_4$ is the same as $X_1$ of Chemical Formula 1, and $Y_4$ can be a divalent organic group of Chemical Formula 12. $Y_4$ can be a functional group derived from a diamine compound used at the time of synthesis of polyamic acid.

The polymer can include a homopolymer containing only the polyamic acid repeating unit of Chemical Formula 1, or a copolymer in which the polyamic acid repeating unit of Chemical Formula 11 is mixed as needed, while essentially containing the polyamic acid repeating unit of Chemical Formula 1.

That is, the polymer includes the polyamic acid repeating unit of Chemical Formula 11 together with the polyamic acid repeating unit of Chemical Formula 1 resulting from mixing two diamines at the time of synthesis of polyamic acid.

Further, the polymer can be a polyamic acid ester repeating unit of the following Chemical Formula 13 or a polyimide repeating unit of the following Chemical Formula 14:

[Chemical Formula 13]

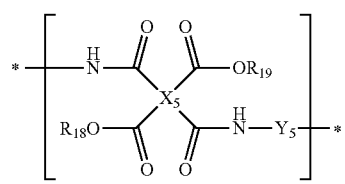

[Chemical Formula 14]

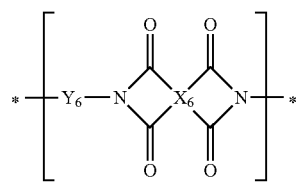

wherein in Chemical Formulas 13 and 14, one of $R_{18}$ and $R_{19}$ is an alkyl having 1 to 10 carbon atoms and the other is hydrogen or an alkyl having 1 to 10 carbon atoms; $X_5$ and $X_6$ are each independently the same as $X_1$ of Chemical Formula 1; and $Y_5$ and $Y_6$ are each independently the same as $Y_4$ of Chemical Formula 11. That is, $Y_5$ and $Y_6$ can be a divalent organic group of Chemical Formula 12.

That is, the polymer can include a homopolymer containing only the polyamic acid repeating unit of Chemical Formula 1, or a copolymer in which one polyamic acid ester repeating unit of Chemical Formula 13, one polyimide repeating unit of Chemical Formula 14, or two or more repeating units thereof are mixed as needed, while essentially containing the polyamic acid repeating unit of Chemical Formula 1.

(2) Light Stabilizer Compound

The liquid crystal aligning agent composition of one embodiment can include a light stabilizer compound containing a functional group a Chemical Formula 3 in addition to the polymer described above, and the physical/chemical properties of the light stabilizer compound are considered to be due to the specific structure of Chemical Formula 3 described above.

The light stabilizer compound containing a functional group of Chemical Formula 3 is a hindered amine compound widely used as a conventional light stabilizer and has been used in combination with a liquid crystal for the purpose of improving after-image characteristics of a liquid crystal display.

However, when a liquid crystal to which a hindered amine compound has been added is applied to a liquid crystal display as described above, there is a limit in that a bright spot is generated in the liquid crystal display due to the interaction between the liquid crystal alignment film and the hindered amine-based compound at the contact portion of the liquid crystal alignment film and the liquid crystal.

Thus, in one embodiment, a hindered amine-based compound is added to a liquid crystal aligning agent composition which is a precursor used in the synthesis of a liquid crystal alignment layer, instead of adding a hindered amine-based compound to the liquid crystal as in the prior art. Thereby, it is possible to improve the after-image characteristic of the liquid crystal display and reduce the generation of bright spot, thereby realizing excellent reliability.

Specifically, in the functional group of Chemical Formula 3, $R_1$ can be hydrogen or an alkyl group having 1 to 5 carbon atoms, $R_2$ to $R_5$ each independently can be an alkyl group having 1 to 5 carbon atoms, and $L_1$ and $L_2$ each independently can be an alkylene group having 1 to 5 carbon atoms.

More specifically, the functional group of Chemical Formula 3, can be a functional group of the following Chemical Formula 3-1 in which $R_1$ is methyl group having 1 carbon atom, $R_2$ to $R_5$ all are a methyl group having 1 carbon atom, and both $L_1$ and $L_2$ are a methylene group having 1 carbon atom. Further, the functional group of Chemical Formula 3 can be a functional group of the following Chemical Formula 3-2 in which $R_1$ is a hydrogen, $R_2$ to $R_5$ all are a methyl group having 1 carbon atom, and both $L_1$ and $L_2$ are a methylene group having 1 carbon atom:

[Chemical Formula 3-1]

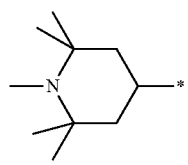

[Chemical Formula 3-2]

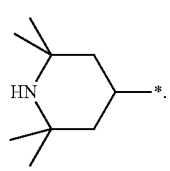

The light stabilizer compound containing a functional group of Chemical Formula 3 can include a compound by of the following Chemical Formula 8:

[Chemical Formula 8]

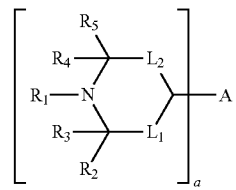

wherein in Chemical Formula 8, $R_1$ is hydrogen or an alkyl group having 1 to 10 carbon atoms; $R_2$ to $R_5$ are the same as or different from each other, and are each independently an alkyl group having 1 to 10 carbon atoms; $L_1$ and $L_2$ are the same as or different from each other, and are each independently a direct bond or an alkylene group having 1 to 10 carbon atoms; A is a monovalent to pentavalent organic group, and a is an integer from 1 to 5.

In Chemical Formula 8, $R_1$ to $R_5$, and $L_1$ and $L_2$ are the same as defined in the Chemical Formula 3, the A is a functional group positioned at the center of the light stabilizer compound, and a functional group in brackets "[ ]" in Chemical Formula 8 can be bonded to a terminal functional group contained in A, wherein the number of functional groups in brackets is a.

That is, in Chemical Formula 8, when a is 1, A is a monovalent functional group. Also, when a is 2, A is a divalent functional group. Further, when a is 3, A is a trivalent functional group. Further, when a is 4, A is a tetravalent functional group. Further, when a is 5, A is a pentavalent functional group.

Preferably, in Chemical Formula 8, specific examples may be when i) A is a tetravalent alkyl group having 1 to 20 carbon atoms to which four ester groups are bonded, and a is 4; or when ii) A is a carbonate group or an alkylene group having 1 to 20 carbon atoms to which two ester groups are bonded, and a is 2; or when iii) A is a (meth)acrylate group, and a is 1.

Specifically, when i) A is a tetravalent alkyl group having 1 to 20 carbon atoms to which four ester groups are bonded, and a is 4, the tetravalent alkyl group having 1 to 20 carbon atoms to which four ester groups are bonded can be of the following Chemical Formula 9:

[Chemical Formula 9]

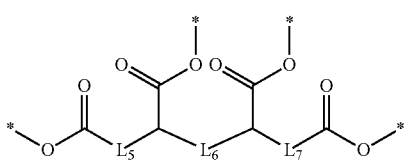

wherein in Chemical Formula 9, $L_5$ to $L_7$ are the same as or different from each other, and are each independently a direct bond or an alkylene group having 1 to 6 carbon atoms. Preferably, in Chemical Formula 9, $L_5$ and $L_7$ are each independently an alkylene group having 1 to 3 carbon atoms, and $L_6$ can be a direct bond. More preferably, the group of Chemical Formula 9 can have the following Chemical Formula 9-1 in which $L_5$ and $L_7$ are each independently a methylene group having 1 carbon atom, and $L_6$ is a direct bond:

[Chemical Formula 9-1]

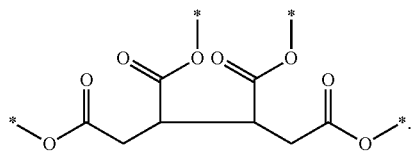

That is, in Chemical Formula 8, when A is a tetravalent alkyl group having 1 to 20 carbon atoms to which 4 ester groups are bonded, and a is 4, specific examples can be tetrakis(2,2,6,6-tetramethylpiperidin-4-yl)butane-1,2,3,4-tetracarboxylate of Chemical Formula a in Example 1 described below; or tetrakis(1,2,2,6,6-pentamethylpiperidin-4-yl)butane-1,2,3,4-tetracarboxylate of Chemical Formula b in Example 2 described below.

When ii) A is a carbonate group or an alkylene group having 1 to 20 carbon atoms to which two ester groups are bonded, and a is 2, the alkylene group having 1 to 20 carbon atoms to which two ester groups are bonded can have the following Chemical Formula 10:

[Chemical Formula 10]

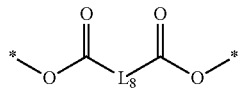

wherein in Chemical Formula 10, $L_8$ is an alkylene group having 1 to 20 carbon atoms. Preferably, in Chemical Formula 10, $L_8$ can be an alkylene group having 5 to 10 carbon atoms. More preferably, the group of Chemical Formula 10 can have the following Chemical Formula 10-1 in which $L_8$ is an octylene group having 8 carbon atoms:

[Chemical Formula 10-1]

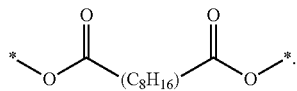

That is, in Chemical Formula 8, when ii) A is a carbonate group or an alkylene group having 1 to 20 carbon atoms to which two ester groups are bonded, and a is 2, specific examples can be bis(2,2,6,6-tetramethylpiperidin-4-yl)decanedioate of Chemical Formula c in Example 3 described below; or bis(1,2,2,6,6-pentamethylpiperidin-4-yl)decanedioate of Chemical Formula d in Example 4 described below; or bis(2,2,6,6-tetramethyl-1-(undecyloxy)piperidin-4-yl) carbonate of Chemical Formula e in Example 5 described below In addition, when iii) A is a (meth)acrylate group, and a is 1, the (meth)acrylate group means an acrylate group or a methacrylate group, and preferably, a methacrylate group can be used.

That is, in Chemical Formula 8, when iii) A is a (meth)acrylate group, and a is 1, specific examples can be 1,2,2,6,6-pentamethylpiperidin-4-yl methacrylate of Chemical Formula f in Example 6 described below; or 2,26-tetramethylpiperidin-4-yl methacrylate of Chemical Formula g in Example 7 described below.

When the (meth)acrylate group is bonded to the end of the functional group of Chemical Formula 3 as described above, as the (meth)acrylate group reacts with the main chain of the liquid crystal alignment layer to form a bond, the effect of improving the after-image characteristic and the reliability in the liquid crystal alignment film can be realized more stably.

More specifically, the liquid crystal alignment film is a photo alignment film produced by coating, drying, light-irradiating, and curing the liquid crystal aligning agent composition of one embodiment, which is preferably a decomposition-type photo alignment film in which part of the main chain is decomposed at the time of light irradiation to exhibit alignment properties. The maleimide functional group remaining in the decomposition-type photo alignment film can react with the (meth)acrylate group present in the light stabilizer compound to form a bond.

The light stabilizer compound containing a functional group of Chemical Formula 3 can be contained in an amount from 50 ppm to 10000 ppm, or 100 ppm to 2000 ppm based on the weight of the polymer contained in the liquid crystal aligning agent composition. When the content of the light stabilizer compound is excessively large, due to the reaction with the acid component of the polyamic acid, the salt is formed or the light stabilizer compound is hardly dissolved sufficiently and precipitation occurs, which can lower the reliability of the liquid crystal aligning agent composition.

On the other hand, when the content of the light stabilizer compound is excessively small, it can be difficult to sufficiently realize the after-image characteristic and the reliability improving effect resulting from addition of the light stabilizer compound in the liquid crystal aligning agent composition.

II. Method of Preparing Liquid Crystal Alignment Film

In addition, the present disclosure provides a method for preparing a liquid crystal alignment film including: a step of coating the liquid crystal aligning agent composition onto a substrate to form a coating film (step 1); a step of drying the coating film (step 2); a step of irradiating the dried coating film with light or rubbing the coating film to perform alignment treatment (step 3); and a step of heat-treating and curing the alignment-treated coating film (step 4).

Step 1 is a step of coating the liquid crystal aligning agent composition onto a substrate to form a coating film. The details of the liquid crystal aligning agent composition includes those described above in one embodiment.

The method of coating the liquid crystal aligning agent composition onto a substrate is not particularly limited, and for example, a method such as screen printing, offset printing, flexographic printing, inkjet, and the like can be used.

Further, the liquid crystal aligning agent composition can be dissolved or dispersed in an organic solvent. Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate and the like. They can be used alone or in combination of two or more.

In addition, the liquid crystal aligning agent composition can further include other components in addition to the organic solvent. In a non-limiting example, when the liquid crystal aligning agent composition is coated, additives capable of improving the uniformity of the thickness of a film and the surface smoothness, or improving the adhesion between a liquid crystal alignment film and a substrate, or changing the dielectric constant and conductivity of a liquid crystal alignment film or increasing the denseness of a liquid crystal alignment film, can be further included. Examples of these additives include various kinds of solvents, surfactants, silane-based compounds, dielectrics or crosslinking compounds, etc.

Step 2 is a step of drying the coating film formed by coating the liquid crystal aligning agent composition onto a substrate.

The step of drying the coating film can be performed by a heating means such as a hot plate, a hot air circulating oven, an infrared oven, and the like, and the drying can be performed at a temperature of 50° C. to 150° C., or 50° C. to 100° C.

Step 3 is a step of irradiating the dried coating film with light or rubbing the coating film to perform alignment treatment.

In the alignment treatment step, the light irradiation can be performed by irradiating polarized ultraviolet rays having a wavelength of 150 nm to 450 nm. In this case, the intensity of the light exposure can vary depending on the kind of the polymer for a liquid crystal aligning agent, and an energy of 10 mJ/cm$^2$ to 10 J/cm$^2$, preferably an energy of 30 mJ/cm$^2$ to 2 J/cm$^2$ can be irradiated.

As for the ultraviolet rays, the polarized ultraviolet rays selected among the ultraviolet rays subjected to polarization treatment by a method of passing through or reflecting a polarizing device using a substrate in which a dielectric anisotropic material is coated onto the surface of a transparent substrate such as quartz glass, soda lime glass, soda lime-free glass, etc., a polarizer plate on which aluminum or metal wires are finely deposited, or a Brewster's polarizing device by the reflection of quartz glass, etc., are irradiated to perform the alignment treatment. Herein, the polarized ultraviolet rays can be irradiated perpendicularly to the surface of the substrate, or can be irradiated by directing an angle of incidence toward a specific angle. By this method, the alignment capability of the liquid crystal molecules is imparted to the coating film.

Further, in the alignment treatment step, a method using a rubbing cloth can be employed. More specifically, in the rubbing treatment, the surface of the coating film after the heat treatment step can be rubbed in one direction while rotating the rubbing roller in which a rubbing cloth is attached to a metal roller.

Step 4 is a step of heat-treating and curing the alignment-treated coating film. In this case, the heat treatment can be performed by a heating means such as a hot plate, a hot-air circulation furnace, an infrared furnace and the like, and the heat treatment can be performed at a temperature of 180° C. to 300° C., or 200° C. to 300° C.

III. Liquid Crystal Alignment Film

Further, the present invention can provide a liquid crystal alignment film prepared in accordance with the method for preparing a liquid crystal alignment film described above.

Specifically, the liquid crystal alignment film can include an aligned cured product of the liquid crystal aligning agent composition of the one embodiment. The aligned cured product means a material obtained through an alignment step and a curing step of the liquid crystal aligning agent composition of the one embodiment.

As described above, in case where a liquid crystal aligning agent composition including: a polymer containing a polyamic acid repeating unit of Chemical Formula 1; and a light stabilizer compound containing a functional group of Chemical Formula 3 is used, when applied to an liquid crystal cell, generation of an after-image is remarkably reduced even during long term driving and the change in voltage holding ratio is small even during heat treatment or light treatment, thereby enabling production of a liquid crystal alignment film having excellent reliability.

The thickness of the liquid crystal alignment film is not particularly limited, but for example, it can be freely adjusted within the range of 0.01 m to 1000 km. If the thickness of the liquid crystal alignment film increases or decreases by a specific value, the physical properties measured in the alignment film can also change by a certain value.

IV. Liquid Crystal Display

In addition, the present disclosure provides a liquid crystal display including the liquid crystal alignment film described above.

The liquid crystal alignment film can be introduced into a liquid crystal cell by a known method, and likewise, the liquid crystal cell can be introduced into a liquid crystal display by a known method. The liquid crystal alignment film can be prepared from the liquid crystal aligning agent composition of one embodiment, thereby achieving excellent stability together with excellent various physical properties. Consequently, the liquid crystal display capable of exhibiting high reliability can be provided.

Specifically, the liquid crystal display can have an initial voltage holding ratio ($V_o$) of 90% or more, or 91% to 99%, or 93% to 97% as measured under the conditions of 1V, 1 Hz and 60° C. using 6254C equipment available from TOYO Corporation. When the initial voltage holding ratio ($V_o$) measured under the conditions of 1 V, 1 Hz, and 60° C. using 6254C equipment from TOYO Corporation is decreased to less than 90%, it can be difficult to implement a liquid crystal display having a high-quality driving characteristic at low power.

Further, the liquid crystal display can have a heat-induced VHR fluctuation rate ($\Delta$VHR) of less than 10%, or 1% to 9%, or 2% to 5% as calculated by the following Equation 1 through measuring the voltage holding ratio ($V_1$) after being stored at a temperature of 100° C. for 120 hours:

$$\text{Heat-induced } \Delta \text{VHR } (\%) = (V_1 - V_0) \quad \text{[Equation 1]}$$

When the heat-induced VHR fluctuation rate ($\Delta$VHR) calculated by Equation 1 is increased to 10% or more, the electrical characteristics of the liquid crystal display exposed to the external heat for a long period of time are rapidly changed, which can lower the reliability of the liquid crystal display.

Further, the liquid crystal display can have a light-induced VHR fluctuation rate ($\Delta$VHR) of less than 10%, or 1% to 9%, or 2%, to 7%, or 2% to 5% as calculated by the following Equation 2 through measuring the voltage holding ratio $V_2$) after being exposed to the LCD back light for 120 hours:

$$\text{Light-induced } \Delta \text{VHR } (\%) = (V_2 - V_0) \quad \text{[Equation 2]}$$

When the light-induced VHR fluctuation rate ($\Delta$VHR) calculated by Equation 2 is increased to 10% or more, the electrical characteristics of the liquid crystal display exposed to the external light for a long period of time are changed rapidly, which can lower the reliability of the liquid crystal display.

Further, the liquid crystal alignment cell can be driven under stress conditions at a temperature of 60° C. while maintaining a chess pattern with the full screen driven on a gray scale, and the time of stress application until when the chess pattern remains may be 1000 hours or more, or 1200 hours to 2100 hours.

When the liquid crystal alignment cell is driven under stress condition at 60° C. while maintaining a chess pattern with the full screen driven on a gray scale, and the time of stress application until when the chess pattern remains is reduced to less than 1000 hours, an after-image is generated within a short time after driving of the liquid crystal display, which results in a decrease in alignment stability of the liquid crystal display.

Advantageous Effects

According to the present disclosure, a liquid crystal aligning agent composition having excellent electrical characteristic and afterimage characteristic sufficient for use as high performance liquid crystal displays, and capable of realizing excellent reliability in an outdoor environment such as light or heat, a method for preparing a liquid crystal alignment film using the same, and a liquid crystal alignment film and a liquid crystal display using the same can be provided.

EXAMPLES

The present invention will be described in more detail by way of Examples. However, these Examples are given for illustrative purposes only, and the scope of the invention is not intended to be limited to or by these Examples.

Preparation Example: Preparation of Diamine

Preparation Example 1

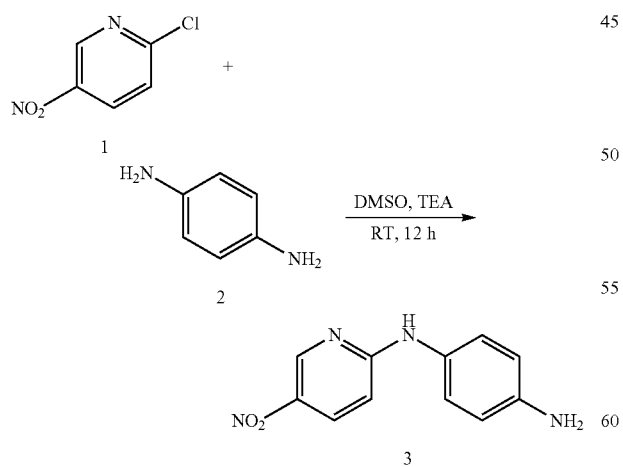

18.3 g (100 mmol) of 2-chloro-5-nitropyridine (compound 1) and 12.5 g (98.6 mmol) of paraphenylenediamine (p-PDA, compound 2) were completely dissolved in 200 mL of dimethylsulfoxide (DMSO), and then 23.4 g (200 mmol) of triethylamine (TEA) was added, and the mixture was stirred at room temperature for 12 hours. When the reaction was completed, the reaction mixture was poured into a container containing 500 mL of water and stirred for 1 hour. The solid obtained by filtration was washed with 200 mL of water and 200 mL of ethanol to obtain 16 g (61.3 mmol) of Compound 3. (Yield: 60%).

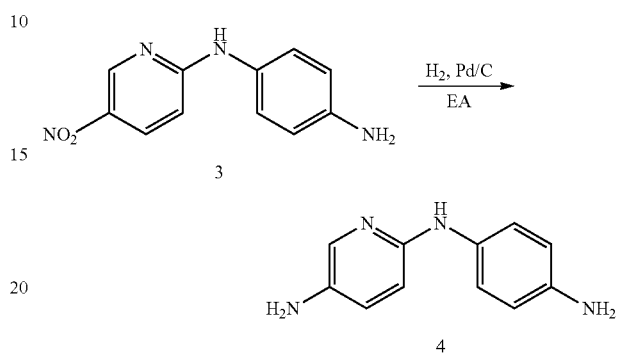

Compound 3 was dissolved in 200 mL of a 1:1 mixture of ethyl acetate (EA) and THF, and 0.8 g of palladium (Pd)/carbon (C) was added and stirred for 12 hours under hydrogen atmosphere. After completion of the reaction, the mixture was filtered through a Celite pad and the filtrate was concentrated to obtain 11 g of Compound 4 diamine. (Yield: 89%).

Preparation Example 2

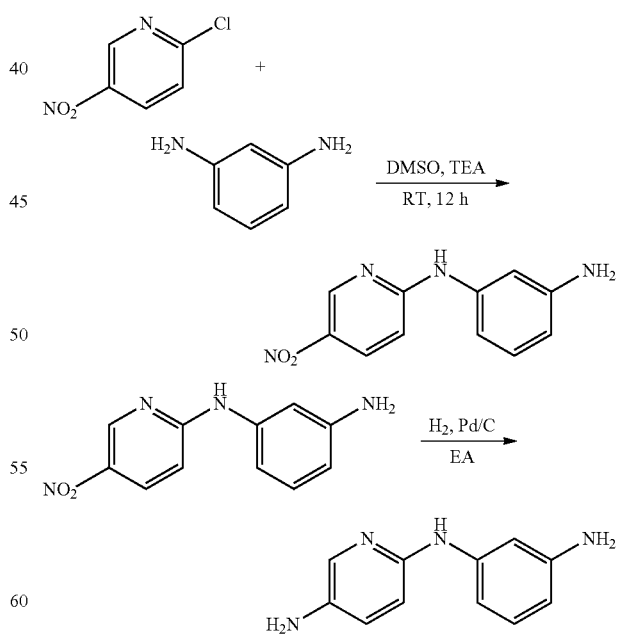

The diamine of Preparation Example 2 was prepared in the same manner as in Preparation Example 1 except that m-phenylenediamine (m-PDA) was used instead of p-phenylenediamine (p-PDA, compound 2).

Preparation Example 3

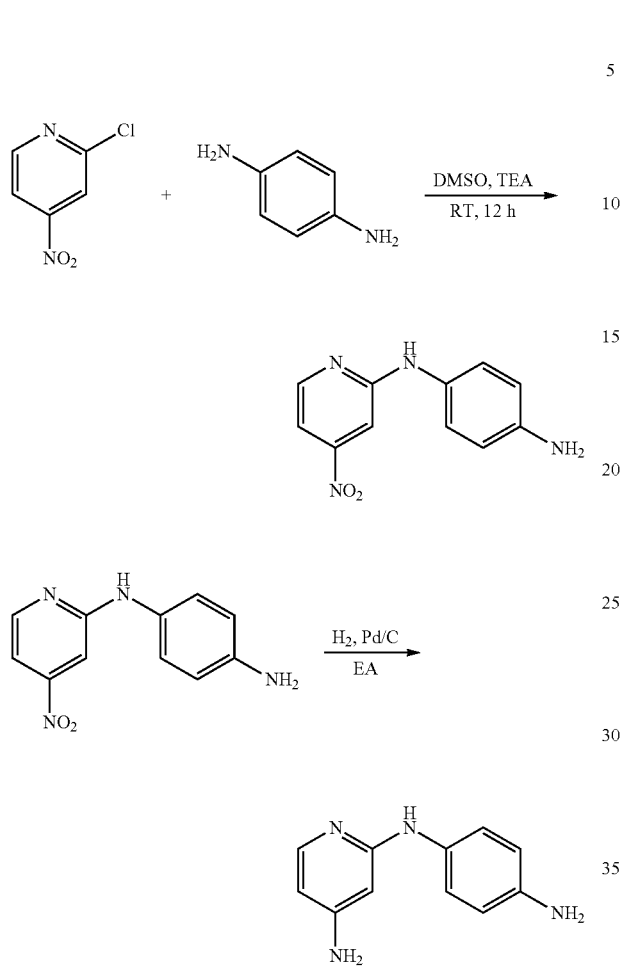

The diamine of Preparation Example 3 was prepared in the same manner as in Preparation Example 1 except that 2-chloro-4-nitropyridine was used instead of 2-chloro-5-nitropyridine (compound 1).

Example: Preparation of Liquid Crystal Aligning Agent Composition and Liquid Crystal Alignment Film

Example 1

(1) Preparation of Liquid Crystal Aligning Agent Composition 19.743 g (0,099 mmol) of the diamine prepared in Preparation Example 1 was completely dissolved in 225.213 g of anhydrous N-methyl pyrrolidone (NMP). Then, 20.0 g (0.092 mmol) of pyromellitic dianhydride (PMDA) was added to the solution under an ice bath and stirred at 25° C. for 16 hours to synthesize a polyamic acid polymer. Then, tetrakis(2,2,6,6-tetramethylpiperidin-4-yl)butane-1,2,3,4-tetracarboxylate of the following Chemical Formula a was added in an amount of 1000 ppm relative to the polyamic acid polymer, followed by stirring for 20 hours to prepare a liquid crystal aligning agent composition:

[Chemical Formula a]

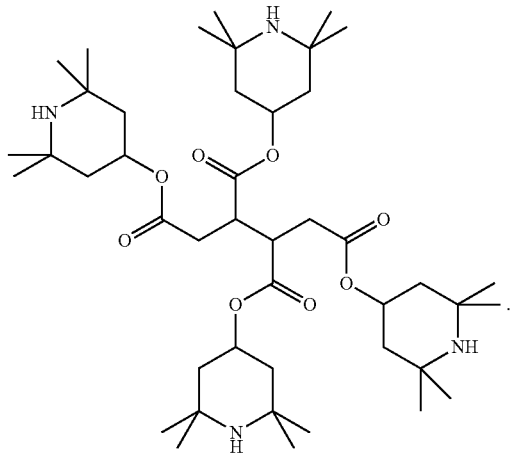

(2) Preparation of Liquid Crystal Alignment Film

The liquid crystal aligning agent composition obtained in (1) of Example 1 was spin-coated onto a rectangular glass substrate having a size of 2.5 cm×2.7 cm, in which an ITO electrode having a thickness of 60 nm and an area of 1 cm×1 cm was patterned. Then, the substrate coated with the liquid crystal aligning agent composition was placed on a hot plate and dried at 80° C. for 2 minutes. Subsequently, the dried coating film was irradiated with ultraviolet rays (254 nm) at a dose of 0.25 J/cm$^2$ using an exposure apparatus to which a linear polarizer was attached, to perform alignment treatment. Then, the alignment-treated film was calcinated (cured) in an oven at 230° C. for 15 minutes to prepare a liquid crystal alignment film having a thickness of 0.1 μm.

Example 2

A liquid crystal aligning agent composition and a liquid crystal alignment film were prepared in the same manner as in Example 1, except that tetrakis(1,2,2,6,6-pentamethylpiperidin-4-yl)butane-1,2,3,4-tetracarboxylate of Chemical Formula b was added instead of the compound of Chemical Formula a, as shown in Table 1 below.

[Chemical Formula b]

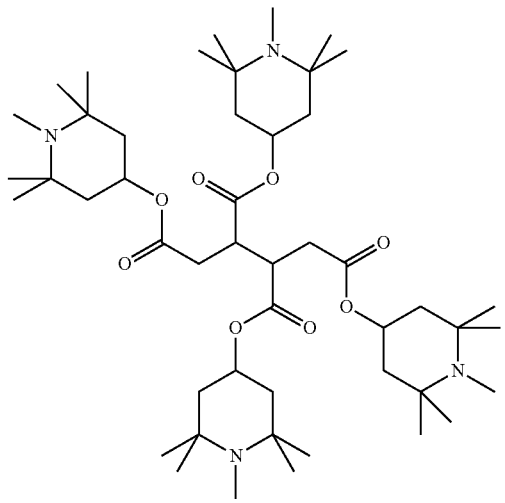

Example 3

A liquid crystal aligning agent composition and a liquid crystal alignment film were prepared in the same manner as in Example 1, except that bis(2,2,6,6-tetramethylpiperidin-4-yl)decanedioate of Chemical Formula c was added instead of the compound of Chemical Formula a, as shown in Table 1 below

[Chemical Formula c]

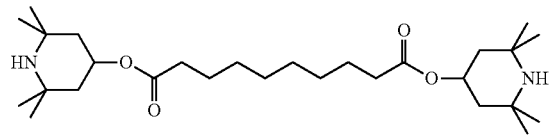

Example 4

A liquid crystal aligning agent composition and a liquid crystal alignment film were prepared in the same manner as in Example 1, except that bis(1,2,2,6,6-pentamethylpiperidin-4-yl)decanedioate of Chemical Formula d was added instead of the compound of Chemical Formula a, as shown in Table 1 below,

[Chemical Formula d]

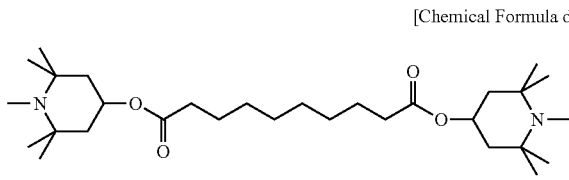

Example 5

A liquid crystal aligning agent composition and a liquid crystal alignment film were prepared in the same manner as in Example 1, except that bis(2,2,6,6-tetramethyl-1-(undecyloxy)piperidin-4-yl)carbonate of Chemical Formula e was added instead of the compound of Chemical Formula a, as shown in Table below.

[Chemical Formula e]

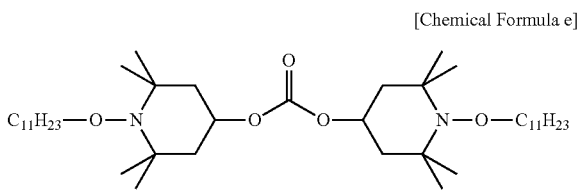

Example 6

A liquid crystal aligning agent composition and a liquid crystal alignment film were prepared in the same manner as in Example 1, except that 1,2,2,6,6-pentamethylpiperidin-4-yl methacrylate of Chemical Formula f was added instead of the compound of Chemical Formula a, as shown in Table 1 below.

[Chemical Formula f]

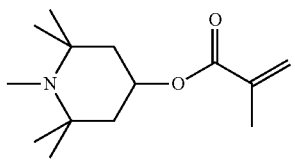

Example 7

A liquid crystal aligning agent composition and a liquid crystal alignment film were prepared in the same manner as in Example 1, except that 2,2,6,6-tetramethylpiperidin-4-yl methacrylate of Chemical Formula g was added instead of the compound of Chemical Formula a, as shown in Table 1 below.

[Chemical Formula g]

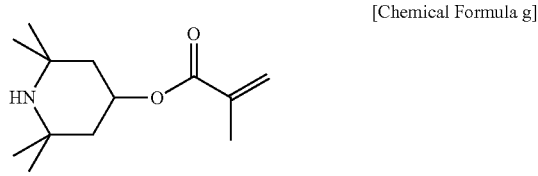 [SMILES: C=C(C)C(=O)OC1CC(C)(C)NC(C)(C)C1]

Comparative Example: Preparation of Liquid Crystal Aligning Agent Composition and Liquid Crystal Alignment Film

Comparative Example 1

A liquid crystal aligning agent composition and a liquid crystal alignment film were prepared in the same manner as in Example 1, except that the compound of Chemical Formula a was not added.

Comparative Example 2

A liquid crystal aligning agent composition and a liquid crystal alignment film were prepared in the same manner as in Example 1, except that 0.099 mmol of p-phenylenediamine (p-PDA) was used instead of the diamine of Preparation Example 1.

Comparative Example 3

A liquid crystal aligning agent composition and a liquid crystal alignment film were prepared in the same manner as in Example 1, except that 0.099 mmol of 4,4'-oxydianiline (ODA) was used instead of the diamine of Preparation Example 1.

Comparative Example 4

A liquid crystal aligning agent composition and a liquid crystal alignment film were prepared in the same manner as in Example 1, except that 0.099 mmol of 4,4'-methylenedianiline (MDA) was used instead of the diamine of Preparation Example 1.

Comparative Example 5

A liquid crystal aligning agent composition and a liquid crystal alignment film were prepared in the same manner as in Example 1, except that 6-(4-aminophenyl)pyridin-3-amine of the following Chemical Formula h was used instead of the diamine of Preparation Example 1:

[Chemical Formula h]

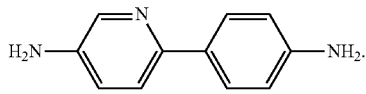

Comparative Example 6

A liquid crystal aligning agent composition and a liquid crystal alignment film were prepared in the same manner as in Example 1, except that 4,4'-diaminodiphenylamine of the following Chemical Formula i was used instead of the diamine of Preparation Example 1:

[Chemical Formula i]

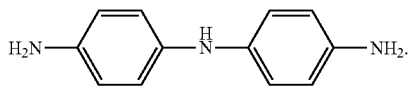

Comparative Example 7

A liquid crystal aligning agent composition and a liquid crystal alignment film were prepared in the same manner as in Example 1, except that a compound of the following Chemical Formula j was used instead of the diamine of Preparation Example 1:

[Chemical Formula j]

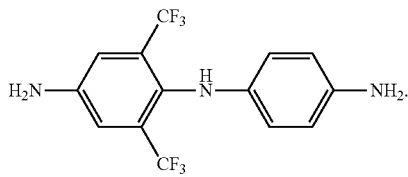

Experimental Example: Measurement of Physical Properties of Liquid Crystal Aligning Agent Composition and Liquid Crystal Alignment Film Obtained in Examples and Comparative Examples The physical properties of the liquid crystal aligning agent composition or the liquid crystal alignment film obtained in Examples and Comparative Examples, and the liquid crystal alignment cell prepared using the same were measured by the following methods, and the results are shown in Table 1.

A specific method for producing a liquid crystal alignment cell is as follows. The liquid crystal alignment films formed on the two glass substrates each used as the upper plate/lower plates were aligned such that they face each other and the alignment directions are aligned with each other, and then the upper and lower substrates were bonded together, and cured with a sealing agent to prepare an empty space. Then, a liquid crystal was injected into the empty cells, and the injection port was sealed with a sealing agent to prepare a liquid crystal alignment cell.

1. Solubility

With respect to the liquid crystal aligning agent compositions obtained in Examples and Comparative Examples, the solubilities of the compounds of Chemical Formulas a to g added to the compositions were evaluated under the following criteria, and the results are shown in Table 1 below.

○: 2000 ppm or more of the light stabilizer compound can be dissolved in the solvent used in the liquid crystal aligning agent composition.

Δ: Less than 2000 ppm of the light stabilizer compound can be dissolved in the solvent used in the liquid crystal aligning agent composition.

X: The light stabilizer compound cannot be dissolved in the solvent used in the liquid crystal aligning agent composition.

2. Voltage Holding Ratio (VHR) and Fluctuation Rate Thereof

The voltage holding ratio ($V_o$) of the liquid crystal alignment cell was measured under the conditions of 1V, 1 Hz and 60° C. using 6254C equipment available from TOYO Corporation, and the results are shown in Table 1 below.

Subsequently, a heat-induced VFW fluctuation rate (ΔVHR) of the liquid crystal alignment cell was calculated by the following Equation 1 through measuring the voltage holding ratio ($V_1$) after being stored at 100° C. for 120 hours:

Heat-induced ΔVHR (%)=($V_1$-$V_0$)     [Equation 1]

In addition, a light-induced VHR fluctuation rate (VHR) of the liquid crystal alignment cell was calculated by the following Equation 2 through measuring the voltage holding ratio ($V_2$) of the liquid crystal display after being exposed to the LCD back light for 120 hours:

Light-induced ΔVHR (%)=($V_2$-$V_0$)     [Equation 2]

3. After-Image Characteristic During Long Term Driving

The liquid crystal alignment cell was driven under stress conditions at a temperature of 60° C. while maintaining a chess pattern with the full screen driven on a gray scale, and whether after-image was generated was confirmed through the presence or absence of the chase pattern. Then, in order to evaluate the after-image characteristic during long-term driving, the time of stress application until when the chess pattern remained was measured, and described in Table 1 below.

TABLE 1

Results of measurement of Experimental Examples of Examples and Comparative Examples

| Category | Solubility | $V_0$ (%) | $V_1$ (%) | Heat-induced $\Delta$VHR (%) | $V_2$ (%) | Light-induced $\Delta$VHR (%) | Occurrence time of after-image |
|---|---|---|---|---|---|---|---|
| Example 1 | Δ | 94% | 92% | −2% | 90% | −4% | 2100 hrs |
| Example 2 | Δ | 94% | 92% | −2% | 91% | −3% | 2100 hrs |
| Example 3 | Δ | 95% | 91% | −4% | 90% | −5% | 1800 hrs |
| Example 4 | ○ | 97% | 95% | −2% | 95% | −2% | 2100 hrs |
| Example 5 | ○ | 95% | 92% | −3% | 91% | −4% | 1500 hrs |
| Example 6 | ○ | 94% | 92% | −2% | 92% | −2% | 1200 hrs |
| Example 7 | Δ | 93% | 88% | −5% | 86% | −7% | 1200 hrs |
| Comparative Example 1 | — | 92% | 83% | −9% | 80% | −12% | 160 hrs |
| Comparative Example 2 | Δ | 75% | 68% | −7% | 65% | −10% | 1500 hrs |
| Comparative Example 3 | Δ | 72% | 66% | −6% | 62% | −10% | 1500 hrs |
| Comparative Example 4 | Δ | 75% | 65% | −10% | 65% | −10% | 1000 hrs |
| Comparative Example 5 | Δ | 70% | 65% | −5% | 60% | −10% | 1200 hrs |
| Comparative Example 6 | Δ | 65% | 60% | −5% | 59% | −6% | 1500 hrs |
| Comparative Example 7 | Δ | 68% | 63% | −5% | 60% | −8% | 1800 hrs |

As shown in Table 1, in the case of the liquid crystal aligning agent compositions of Examples 1 to 7, in which a light stabilizer compound having a characteristic chemical structure of Chemical Formula a to g was added together with a polyamic acid polymer for a liquid crystal aligning agent, it was confirmed that the initial voltage holding ratio of the alignment film prepared therefrom was as high as 93% to 97%, which was excellent in electrical characteristics, and that the width of heat-induced VHR fluctuation rate was 2% to 5%, and the width of light-induced VHR fluctuation rate was 2% to 7%, which are very low, whereby excellent reliability could be realized even when exposed to heat or light for a long period of time. In addition, it was further confirmed that these compositions had excellent alignment stability without occurrence of after-image until long-term driving for 1200 hours to 2100 hours.

In the case of the liquid crystal aligning agent composition of Comparative Example 1 containing only the polyamic acid polymer without adding the light stabilizer compound at all, it was confirmed that the width of the heat-induced VHR fluctuation rate was 9%, and the width of the light-induced VIM fluctuation rate was 12%, which was greatly increased as compared with Examples, and when exposed to heat or light for a long period of time, the reliability was poor compared to Examples. In addition, it was confirmed that as the afterimage was generated only after a short driving time of 160 hours, the alignment stability was also poor compared to Examples.

On the other hand, in the case of the liquid crystal aligning agent compositions of Comparative Examples 2 to 7 using diamines having different chemical structures from those of the diamine monomers of Preparation Examples during the production of the polyamic acid polymer for a liquid crystal aligning agent, it could be confirmed that the initial voltage holding ratio of the alignment film prepared therefrom was 65% to 75%, which was significantly lower than that of the Examples, and thereby the electrical characteristics of the alignment film were poor compared to Examples.

The invention claimed is:

1. A liquid crystal aligning agent composition, comprising:
  a polymer containing a polyamic acid repeating unit of the following Chemical Formula 1; and
  a light stabilizer compound containing a functional group of the following Chemical Formula 3:

[Chemical Formula 1]

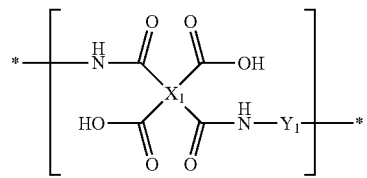

wherein in Chemical Formula 1:
$X_1$ is a tetravalent organic group; and
$Y_1$ is a divalent organic group of the following Chemical Formula 4:

[Chemical Formula 4]

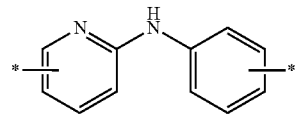

[Chemical Formula 3]

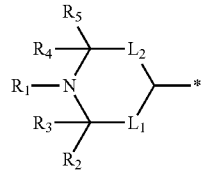

wherein in Chemical Formula 3:
$R_1$ is hydrogen or an alkyl group having 1 to 10 carbon atoms;
$R_2$ to $R_5$ are the same as or different from each other, and are each independently an alkyl group having 1 to 10 carbon atoms; and
$L_1$ and $L_2$ are the same as each other or different from each other, and are each independently a direct bond or an alkylene group having 1 to 10 carbon atoms.

2. The liquid crystal aligning agent composition according to claim 1, wherein in Chemical Formula 1, $X_1$ is a tetravalent organic group having one of the following formulas:

wherein:
$R_6$ to $R_{11}$ are each independently hydrogen, or an alkyl group having 1 to 10 carbon atoms;
$L_3$ is any one selected from the group consisting of a direct bond, —O—, —CO—, —COO—, —S—, —SO—, —SO$_2$—, —CR$_{12}$R$_{13}$—, —(CH$_2$)$_t$—, —O(CH$_2$)$_t$O—, —COO(CH$_2$)$_t$OCO—, —CONH—, phenylene or a combination thereof;
$R_{12}$ and $R_{13}$ are each independently hydrogen, or an alkyl group or a haloalkyl group having 1 to 10 carbon atoms; and
t is an integer from 1 to 10.

3. The liquid crystal aligning agent composition according to claim 1, wherein the polymer further comprises a polyamic acid ester repeating unit of the following Chemical Formula 6; or a polyimide repeating unit of the following Chemical Formula 7:

[Chemical Formula 6]

[Chemical Formula 7]

wherein in Chemical Formulas 6 and 7:
one of $R_{14}$ and $R_{15}$ is an alkyl having 1 to 10 carbon atoms and the other is hydrogen or an alkyl having 1 to 10 carbon atoms;
$X_2$ to $X_3$ are each independently a tetravalent organic group; and
$Y_2$ to $Y_3$ are each independently a divalent organic group of the following Chemical Formula

[Chemical Formula 2]

wherein in Chemical Formula 2:
at least one of $Q_1$ to $Q_8$ is nitrogen and the rest are carbon;
D is —NR'— or —O—; and
R' is hydrogen or an alkyl group having 1 to 6 carbon atoms.

4. The liquid crystal aligning agent composition according to claim 1, wherein the light stabilizer compound containing a functional group of Chemical Formula 3 is a compound of the following Chemical Formula 8:

[Chemical Formula 8]

wherein in Chemical Formula 8:
$R_1$ is hydrogen or an alkyl group having 1 to 10 carbon atoms;
$R_2$ to $R_5$ are the same as or different from each other, and are each independently an alkyl group having 1 to 10 carbon atoms;
$L_1$ and $L_2$ are the same as or different from each other, and are each independently a direct bond or an alkylene group having 1 to 10 carbon atoms;

A is a monovalent to pentavalent organic group; and
a is an integer from 1 to 5.

5. The liquid crystal aligning agent composition according to claim 4, wherein in Chemical Formula 8, A is a tetravalent alkyl having 1 to 20 carbon atoms to which four ester groups are bonded, and a is 4.

6. The liquid crystal aligning agent composition according to claim 4, wherein in Chemical Formula 8, A is a carbonate group or an alkylene group having 1 to 20 carbon atoms to which two ester groups are bonded, and a is 2.

7. The liquid crystal aligning agent composition according to claim 4, wherein in Chemical Formula 8, A is a (meth)acrylate group, and a is 1.

8. The liquid crystal aligning agent composition according to claim 5, wherein the tetravalent alkyl group having 1 to 20 carbon atoms to which four ester groups are bonded has the following Chemical Formula 9:

[Chemical Formula 9]

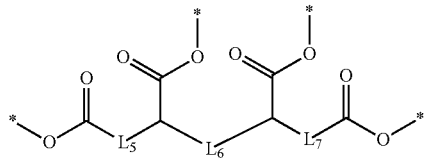

wherein in Chemical Formula 9:
$L_5$ to $L_7$ are the same as or different from each other, and are each independently a direct bond or an alkylene group having 1 to 6 carbon atoms.

9. The liquid crystal aligning agent composition according to claim 6, wherein the alkylene group having 1 to 20 carbon atoms to which the two ester groups are bonded has the following Chemical Formula 10:

[Chemical Formula 10]

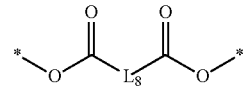

wherein in Chemical Formula 10:
$L_8$ is an alkylene group having 1 to 20 carbon atoms.

10. The liquid crystal aligning agent composition according to claim 1, wherein the light stabilizer compound containing a functional group of Chemical Formula 3 is contained in an amount from 50 ppm to 10000 ppm based on the weight of the polymer.

11. A method for preparing a liquid crystal alignment film comprising the steps of:
coating the liquid crystal aligning agent composition of claim 1 onto a substrate to form a coating film;
drying the coating film;
irradiating the dried coating film with light or rubbing the coating film to perform alignment treatment; and
heat-treating and curing the alignment-treated coating film.

12. A liquid crystal alignment film comprising an aligned cured product of the liquid crystal aligning agent composition of claim 1.

13. A liquid crystal display comprising the liquid crystal alignment film of claim 12.

14. A liquid crystal alignment film, prepared by the method of claim 11.

* * * * *